United States Patent [19]

Schieber

[11] Patent Number: 5,678,741
[45] Date of Patent: Oct. 21, 1997

[54] BACKSEAT BUTLER DRINK HOLDER

[76] Inventor: August Fredrick Schieber, 19140 Delight St., Santa Clarita, Calif. 91351

[21] Appl. No.: 598,665

[22] Filed: Feb. 8, 1996

[51] Int. Cl.$^6$ .................................................. B60R 7/04
[52] U.S. Cl. ........................... 224/275; 224/926; 108/44; D12/416; D12/420
[58] Field of Search ............................. 224/275, 926, 224/270; D2/419, 420, 400, 415, 416, 425; 108/44, 45, 46, 43; 248/311.2

[56] References Cited

U.S. PATENT DOCUMENTS

| | | | |
|---|---|---|---|
| D. 206,449 | 12/1966 | Terry | D12/416 |
| D. 298,884 | 12/1988 | Rychlock | D12/420 |
| D. 344,625 | 3/1994 | Berry | D12/416 |
| 2,889,051 | 6/1959 | Kramer | 108/46 |
| 3,009,613 | 11/1961 | Noland | 224/270 |
| 3,232,250 | 2/1966 | Hamilton et al. | 108/44 |
| 3,233,563 | 2/1966 | Mauchline | 108/44 |
| 3,756,481 | 9/1973 | Schaefer | 224/275 |
| 3,817,190 | 6/1974 | Evangelista | 108/44 |
| 4,928,865 | 5/1990 | Lorence et al. | 224/275 |
| 5,046,433 | 9/1991 | Karmer et al. | 108/44 |
| 5,370,060 | 12/1994 | Wang | 108/44 |
| 5,443,018 | 8/1995 | Cromwell | 108/44 |

Primary Examiner—Henry J. Recla
Assistant Examiner—Gregory M. Vidovich

[57] ABSTRACT

A folding appliance that attaches to seat backs in automobiles and other vehicles that includes a tray for holding drink containers, a support rod that mounts to the seat back and a cup support rod that mounts to the bottom of the tray. The tray is latched and secured to the support rod with latches molded into the tray body which secures the tray in the storage/vertical position. The tray is located in the usary/horizontal position by a tray stop that is also molded into the tray body. The cup support rod swings into the cavity of the tray bottom when in the storage position and positions itself under the tray when the tray is in the usary position.

4 Claims, 3 Drawing Sheets

BACKSEAT BUTLER DRINK HOLDER

BACKGROUND OF THE INVENTION

The invention of the Backseat Butler Drink Holder was to afford a convenient and needed apparatus for backseat passengers to hold various drink containers. It would be self-storing when not in use to conserve space.

SUMMARY OF THE INVENTION

It is an object of the invention to provide a means for backseat passengers of automobiles and other transportation vehicles to hold drink cups and other drink containers. A further objective is to be in an easy, usable position taking minimal space when in use. It will swing up into storage position when not in use, conserving space. It also takes only seconds to install and remove with no tools required.

BRIEF DESCRIPTION OF THE DRAWINGS

The present invention will be fully understood by reference to the following detailed description when read in conjunction with the attached drawings.

DETAILED DESCRIPTION OF THE DRAWINGS

Figure 1:
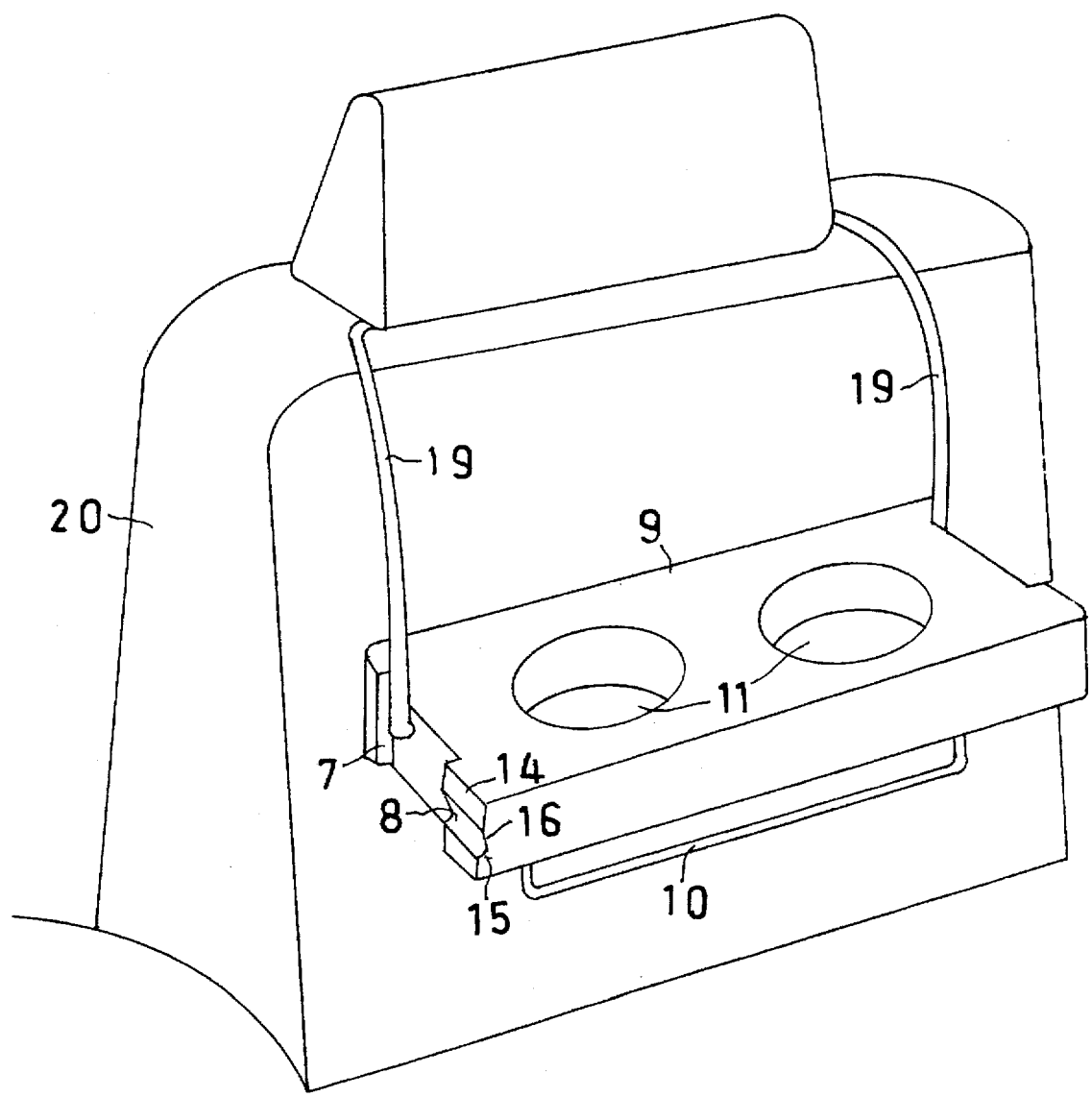
FIG. 1 is a view of the Backseat Butler installed to the seat back of an automobile in the usary position.
Figure 2:
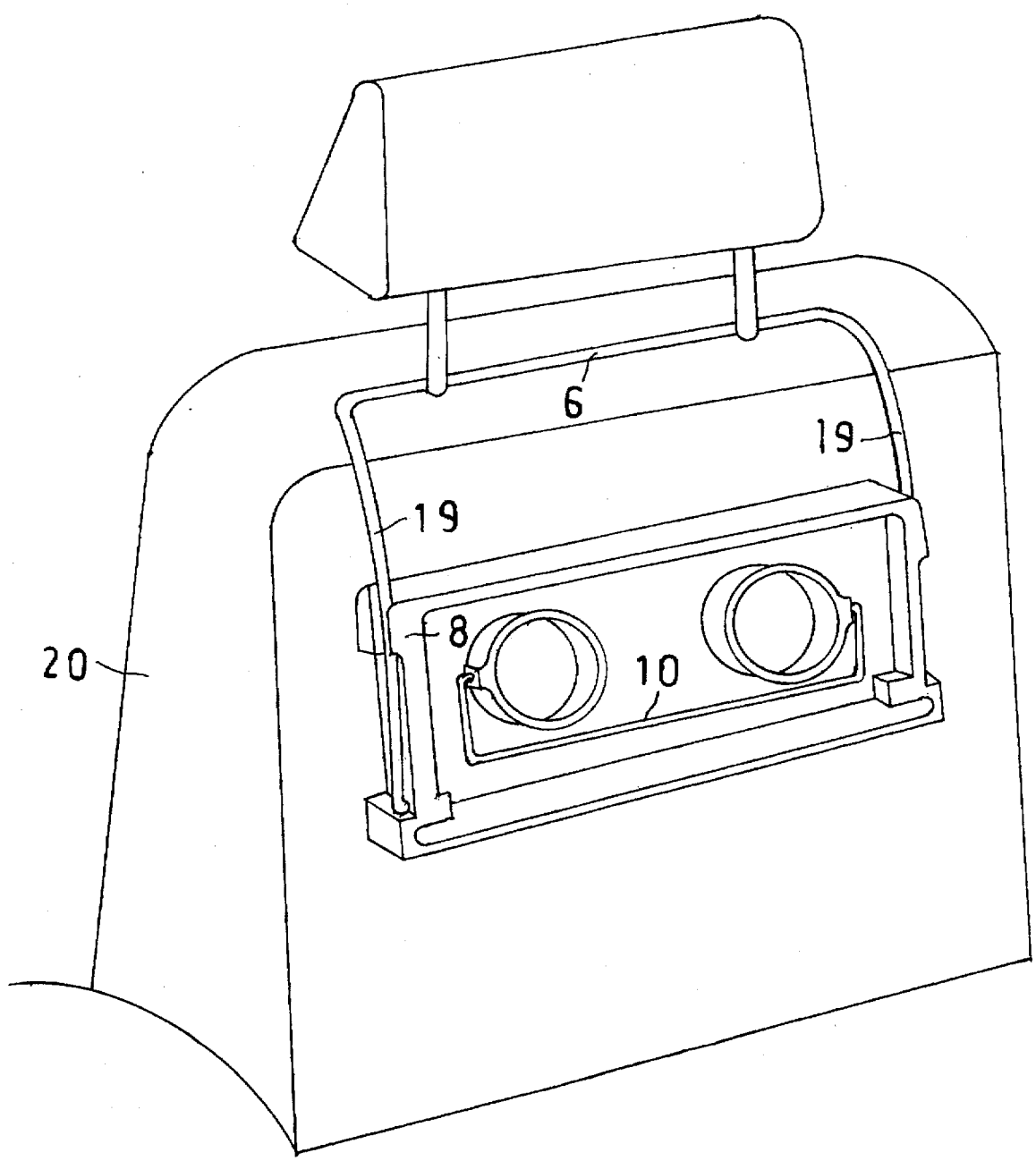
FIG. 2 is a view of the Backseat Butler when raised to the storage position, conserving space when not in use and showing the method in which the invention is attached to the seat back under the headrest.

FIGS. 1 and 2 show a drink holder tray(9) attached to a vehicle seat back(14) by a hanger rod(6). The hanger rod (6) as seen in FIG. 1 has a bight (19) to conform to the vehicle seat back(20). The hanger rod(6) as seen in FIG. 3 has ends(18) bent inward to attach to holes(12) in tray(9) to allow the tray to pivot into the usary and storage positions.

The drink holder tray(9) includes a ramp latch(8) as seen in FIG. 2 which secures the tray to the hanger rod(6) in the storage position. The ramp latch(8) as seen in FIG. 1 consists of an angled ramp(14) that guides the hanger(6) in the cylindrical pocket(15) by flexing the rod outward, which secures the tray(9) into the storage position as seen in FIG. 2. When the tray(9) is pulled into the usary position as seen in FIG. 1 the ramp(16) leads the hanger rod(6) out of the cylindrical pocket(15) and allows it to engage the tray stop(7) as seen in FIG. 1. The tray stop(7) is molded into the tray and extends out to engage the hanger rod(6) when the tray is in the usary position as seen in FIG. 1.

Figure 3:
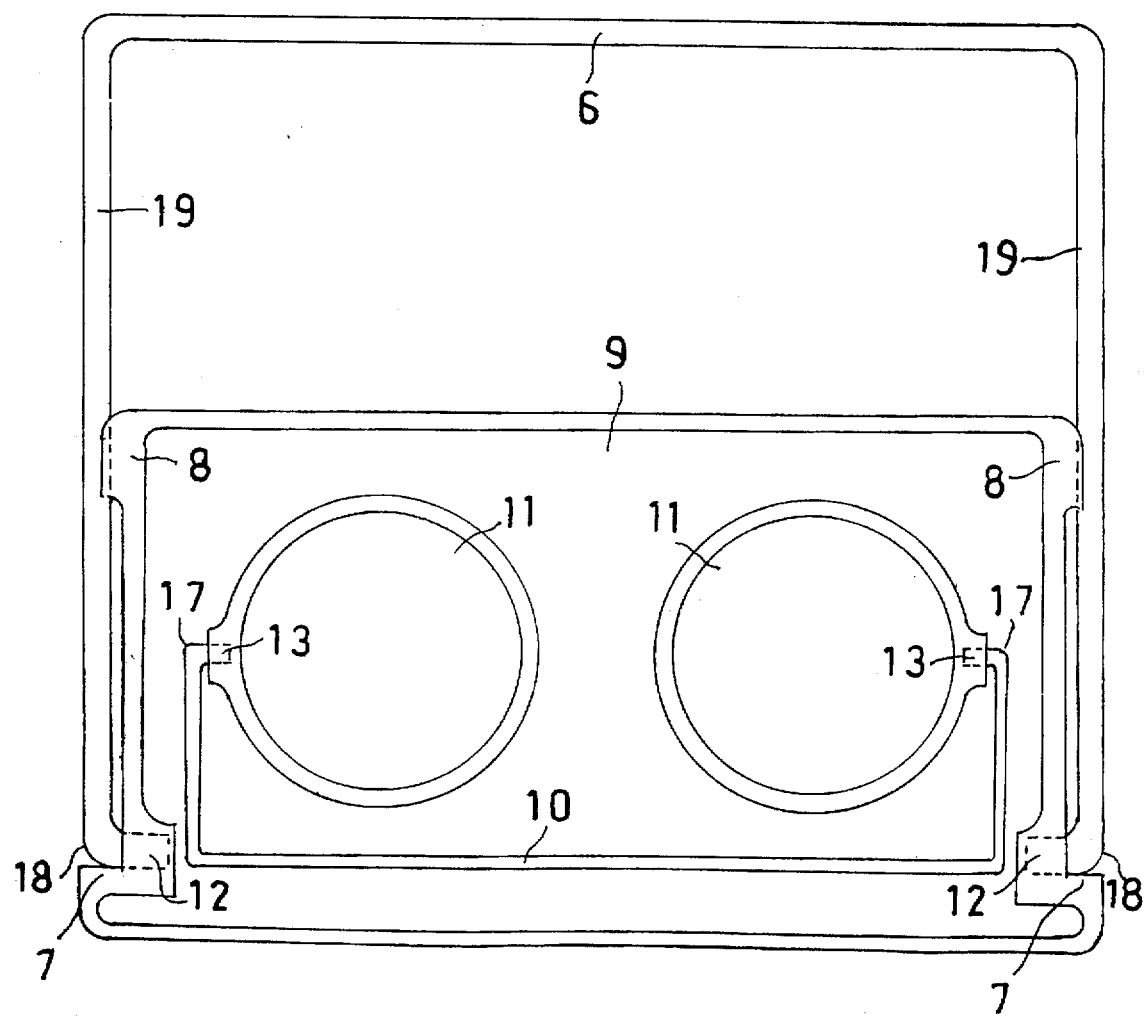
FIG. 3 is a view of the three parts that comprise the Backseat Butler fully assembled.

The drink holder tray(9) includes two through holes(11) as seen in FIGS. 1 and 3 to accept drink containers. The support rod(10) as seen in FIG. 1 automatically swings down to the support position when the tray(9) is in the usary position. When the drink holder tray is not in use and is raised to the storage position as seen in FIG. 2 the support rod(10) conversely swings into the cavity at the bottom of the tray. The support rod(10) as seen in FIG. 3 is bent inward at the ends(17) as seen in FIG. 3. This design allows the support rod to engage the support rod holes(13) as seen in FIG. 3 in the tray which allows the rod to pivot into the the storage and usary positions.

The foregoing invention has been described and illustrated in some detail. It is understood that some changes may be made in the construction and arrangement of the drink holder tray without departing from the scope of the invention.

I claim:

1. A tray device for use in a vehicle, said device comprising:

a substantially U-shaped support having opposing end portions and an intermediate portion adapted to be mounted to a headrest;

a substantially planar tray having means to receive at least one drink container and having opposing ends and opposing longitudinal sides extending substantially transverse to said ends, said ends each having opposing proximal and distal ends;

said tray further having a ramp latch integrally formed with at least one of said opposing ends at said distal end thereof and a stop integrally formed with at least one of said opposing ends at said proximal end thereof, said end portions respectively connected to said opposing ends intermediate said proximal and distal ends such that said tray may pivot therebetween between a first substantially vertical position wherein an adjacent one of said end portions is resiliently received in said at least one ramp latch and a second substantially horizontal position wherein said at least one stop abuts an adjacent one of said end portions to prevent pivotal movement there beyond.

2. A device according to claim 1 wherein said means to receive at least one drink container comprises at least one through hole extending through said tray.

3. A device according to claim 2 wherein said tray further comprising a container support in connection with an undersurface of said tray which provides support for a container received in said at least one through hole.

4. A device according to claim 3 wherein said container support is pivotally connected to said tray such that when said tray is in said first position, said container support pivots to a non-use position closely adjacent said tray and when said tray is in said second position, said container support pivots to a use position under said at least one through hole to provide support for a container mounted therein.

* * * * *